United States Patent

[11] 3,585,623

| [72] | Inventor | Joseph F. Laukaitis<br>Rochester, N.Y. |
|---|---|---|
| [21] | Appl. No. | 863,068 |
| [22] | Filed | Oct. 2, 1969 |
| [45] | Patented | June 15, 1971 |
| [73] | Assignee | Eastman Kodak Company<br>Rochester, N.Y. |

[54] OPEN CIRCUIT DETECTOR FOR HEATING ELEMENT
8 Claims, 4 Drawing Figs.

[52] U.S. Cl............................................. 340/256,
53/78, 53/182, 219/388, 324/51, 324/127, 340/419
[51] Int. Cl....................................................G08b 21/00
[50] Field of Search.......................................... 340/253,
253 B, 256, 271; 219/388; 53/78, 182; 324/51, 127, 66

[56] References Cited
UNITED STATES PATENTS

| 2,677,100 | 4/1954 | Hayhurst...................... | 324/51 |
| 2,731,599 | 1/1956 | Groeper....................... | 324/70 |
| 2,825,025 | 2/1958 | Fischer......................... | 324/51 |
| 2,897,444 | 7/1959 | Garscia et al................. | 324/127 X |
| 3,388,526 | 6/1968 | Harm et al.................... | 53/182 |

Primary Examiner—John W. Caldwell
Assistant Examiner—David L. Trafton
Attorneys—Walter O. Hodsdon and Robert F. Cody ABSTRACT: The electrical continuities of a pair of parallel heater wires—which form part of a conveyor element in a packaging machine, and which heater wires, in combination or singularly, provide an impedance within the same range that obtains between such wires and contact brushes—are checked as follows: An alternating current is passed through the heater wires; and a magnetic pickup is adapted to scan the field around the heater wires. The duration of pickup depends on the number of heater wires which are electrically continuous.

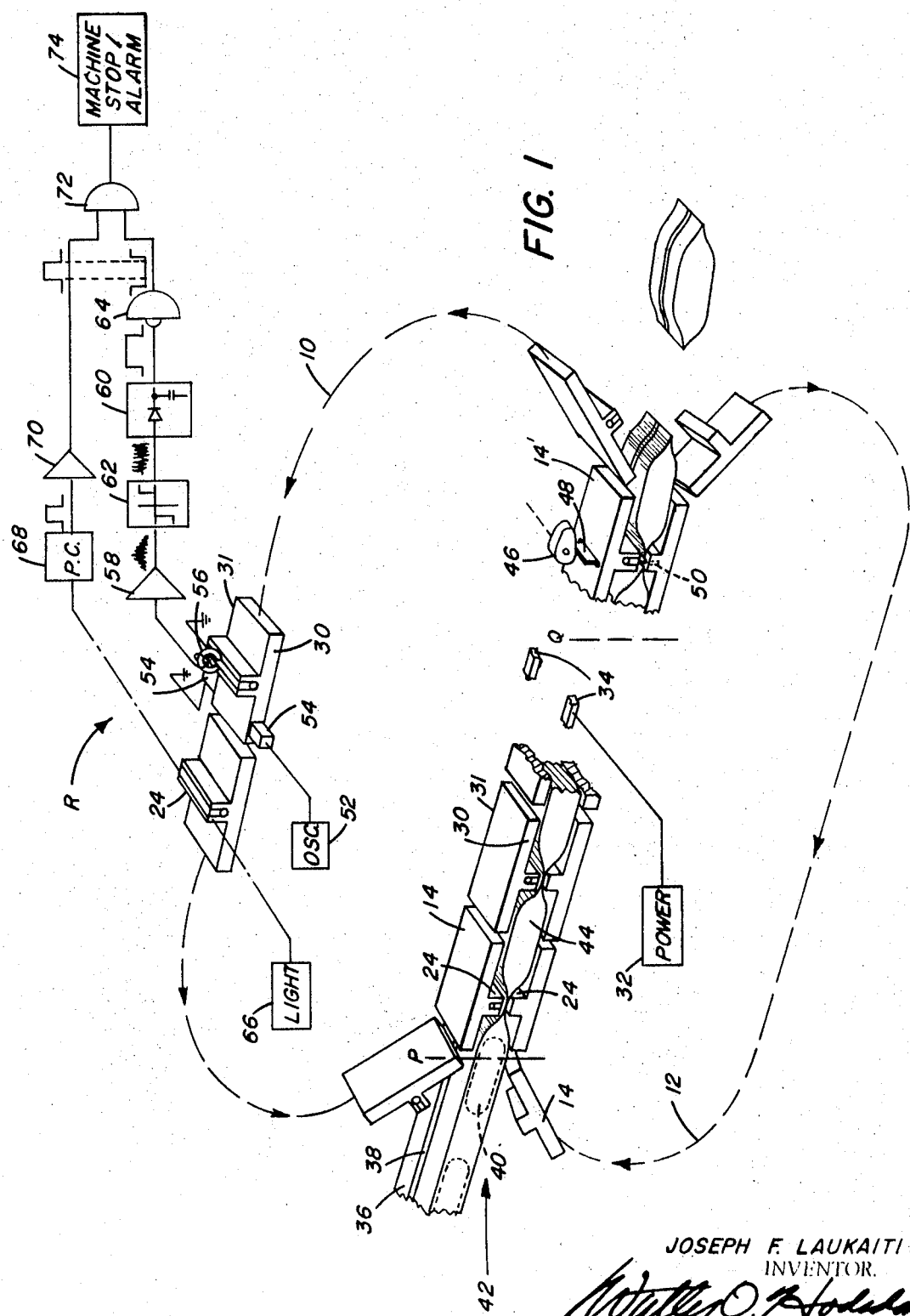

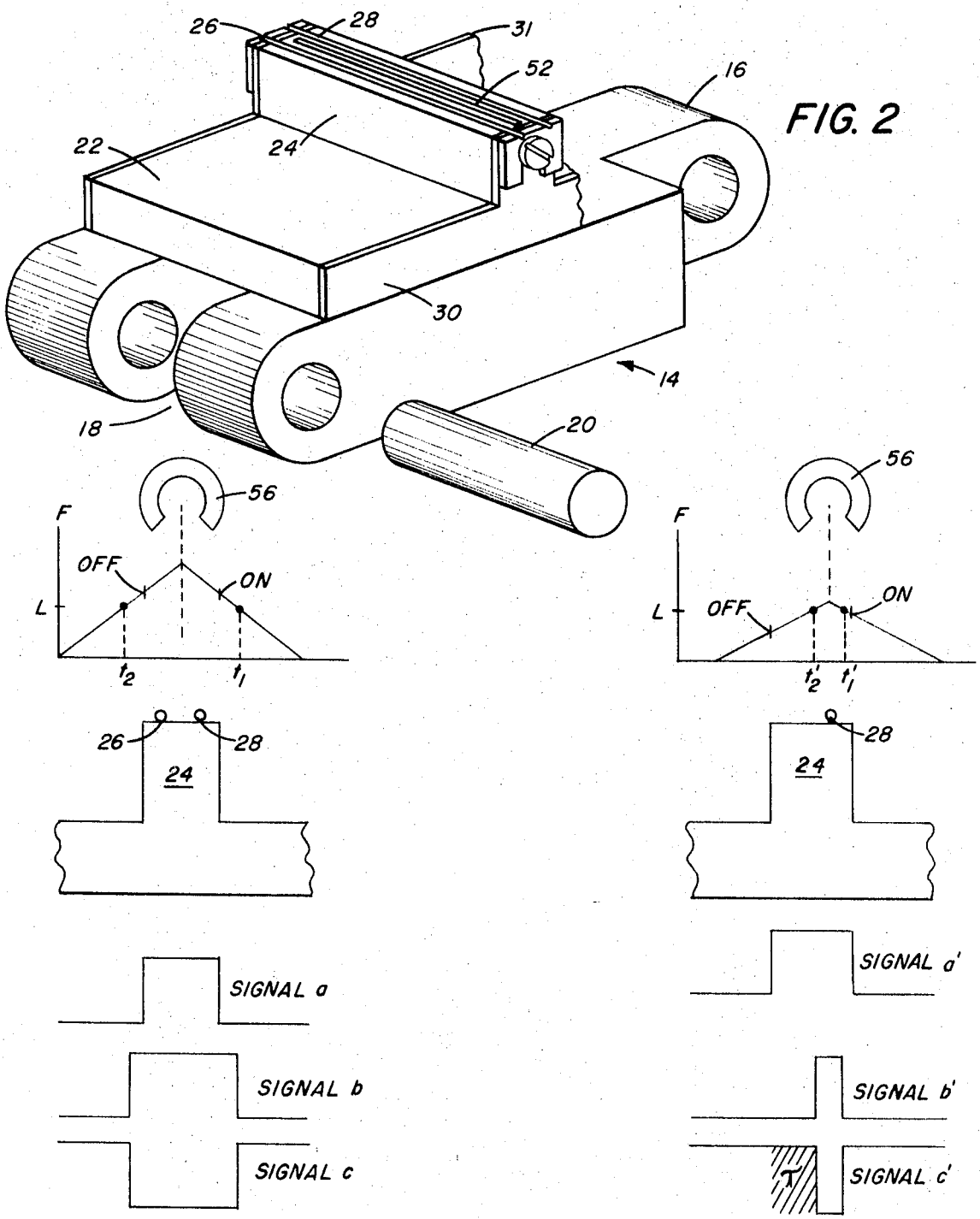

OPEN CIRCUIT DETECTOR FOR HEATING ELEMENT

BACKGROUND OF THE INVENTION

1. Field of the Invention

This invention relates to a way for checking electrical conductivity; and in particular to apparatus for determining whether any of a plurality of adjacent electrical heaters, connected in parallel, are open.

The invention, for purposes of illustration, is cast in the environment of a packaging machine.

2. Description Relative to the Prior Art

A certain packaging machine employs conveyor elements for forming packages. Each conveyor element has a pair of adjacent heater wires, electrically connected in parallel, for heat sealing the packages so formed. Both heaters must function for proper package sealing; and electrical power is applied to the heaters by means of brushes. The combined resistance of the heaters is approximately 0.065 ohms; and the resistance of a single heater is 0.13 ohms. Since brush contact resistance varies within a range that brackets the heater resistance(s), ohmic-, voltage-, and current-type checks for heater continuity are not possible during machine operation.

SUMMARY OF THE INVENTION the invention is based on the principle that if an alternating current is passed through a plurality of adjacent conductors which are electrically connected in parallel, and if a magnetic pickup is adapted to scan the field in the vicinity of such conductors, then the envelope-duration of the signal (above a predetermined level) produced at the pickup will depend on whether all of the conductors are continuous. The invention employs such principle in a packaging machine of the above referred to certain type, thereby to eliminate waste incident to locating and otherwise handling defective packages.

Pickup signal-envelope durations for the heaters of the successive conveyor elements are effectively compared with a reference duration—which reference duration is approximately the same as the pickup signal-envelope duration which obtains when all heaters of a given conveyor element are continuous—whereby when an error occurs therebetween, a machine stop and/or alarm are actuated to indicate a faulty heater. Since the pickup signal-envelope duration is dependent on the rate at which the respective conveyor elements traverse the magnetic pickup in question, the above-mentioned reference duration is—in a presently preferred form of the invnetion—made dependent on the machine speed: the slower the machine speed, the longer the reference duration, an vice versa. Thus, regardless of the speed at which packaging obtains, apparatus according to the invention works efficiently for the purpose intended.

An object of the invention is to provide a way to check the electrical continuity of an element by sensing the magnetic field in the vicinity of such element.

Another object of the invention is to provide a way to determine whether any of a plurality of adjacent conductors, electrically connected in parallel, are open.

Another object of the invention is to provide a way to check the respective continuities of electrical heaters employed in a packaging machine, during machine operation, and without regard to machine speed.

The invention will be described with reference to the figures wherein:

FIG. 1 shows, in perspective, the conveyor chains of a packaging machine adapted to embody the invention; and such figure also indicates a schematic block diagram of a test circuit according to the invention, FIG. 2 indicates a packaging machine conveyor element, the heater wires of which may be checked by means of the invention, and FIGS. 3A and 3B are diagrams useful in describing the invention.

Reference should be had to FIGS. 1 and 2: A pair of conveyor chains 10, 12 are provided with package-forming conveyor elements 14. Each element 14 has male and female hinge parts 16, 18, whereby the respective elements 14 may be pivotally coupled chainwise together by means of pins 20. The conveyor elements 14 have T-shaped portions 22; and the chains 10, 12 are disposed to mesh with the uprights 24 of the chain 10 pressing against the uprights 24 of the chain 12. Although each of the conveyor elements 14 of the chain 10 is provided with a pair of (Nichrome) heater wires 26, 28 electrically connected in parallel, the conveyor elements 14 of the chain 12 need not be so provided, i.e. the chain 12 conveyor elements may be dummies. The heater wires 26, 28 are electrically connected to contact plates 30, 31, to which power (32) is applied by means of brushes 34. The brushes 34, which simultaneously contact several conveyor elements 14, run between points $p, q$.

A partially formed package input 36, sealed at 38 and containing contents 40, is fed into the jaws 42 of the meshing conveyor elements 14, whereby discrete package units 44 get shaped into form. The packaging material is of a type which bonds together in response to heat; and so, when electrical power is applied to each pair of heater wires 26, 28, parallel heat seals are formed, in pairs, separating the contents 40 within the individual package units 44 from each other. Then, as each chain 10 conveyor element 14 exits from its heat-application stage $(p, q)$, a cam 46 is brought to bear against a respective conveyor element knife 48. (While only one conveyor element 14' is indicated as having a knife, it is to be understood that all of the chain 10 conveyor elements 14 are so provided; and that the chain 12 conveyor elements 14 have recesses 50 which cooperate to accept such knives.) Each knife 48, housed within its respective slot 52, is periodically actuated to chop between the above-mentioned parallel heat seals, thereby to separate the package units 44 from each other.

It will be appreciated that if either heater wire 26, 28 of a conveyor element is open, defective packaging of the contents 40 will periodically occur. Because of such periodicity—rather than when all packages in a succession thereof are defective—the location and removal of defective packages is difficult, time consuming, and costly.

As stated above, the resistance between the brushes 34 and the contact plates 30, 31 of the conveyor elements 14 varies within a range that brackets the resistance which obtains for a given conveyor element 14 when one, or both, of its heater wires is (are) continuous. Such contact resistance variations result, among other things, from the sliding and vibratory movement of the conveyor elements between the brushes 34; and prevent meaningful ohmic-, current-, and voltage-type continuity checks for the heater wires during machine operation.

Continuity checks for the heater wires 26, 28 are, in accordance with he invention, made as follows:

An oscillator 52 successively applies—at a test location R— its output signals to the contact plates 30, 31 of the chain 10 conveyor elements 14, by means of brushes 34. Such oscillator signals cause the heater wires 26, 28 to develop alternating magnetic fields around themselves; and which fields may be scanned and sensed by mean of a magnetic pickup 54. Since the pickup signal depends on the rate of change of field flux, the oscillator 52 signal output is preferably comparatively high in frequency, e.g., at least 6 kc. per second.

The output of the pickup 56 is applied to an amplifier 58; and thence to a detector circuit 60 via a threshold circuit 62. The purpose of the threshold circuit 62—i.e., to provide a signal limit (L) below which the detector 60 is unresponsive— is best appreciated in connection with FIGS. 3A and 3B. Suffice it to say for now, however, that the threshold circuit 62 produces a (13 kc./sec.) pulse which is of a duration at least as long as the time it takes for an upright 24 to pass the reference location R. The detector circuit 60 converts the (13 kc.) signal output from the threshold circuit 62 to a square wave envelope-signal; and applies such envelope-signal to a NOT circuit 64.

To provide a pulse having a reference duration that relates to the speed of the conveyor chains 10, 12, light is beamed from a source 66 thereof to a photocell circuit 68, such light being periodically interrupted, in square wave fashion, by the uprights 24 of the conveyor elements 14. The output from the photocell circuit 68 is amplified (70), and then applied to an AND circuit 72. The output of the NOT circuit is also applied to the AND circuit 72; and when the AND circuit 72 simultaneously receives two input signals—from the circuits 64 and 70—it triggers a machine stop/alarm device 74.

To appreciate how the circuit of FIG. 1 checks heater continuity in accordance with the invention, consider FIG. 3A; and assume for the moment that the upright 24 is stationary with respect to the magnetic pickup 56. Both heater wires 26, 28 are continuous; and thus the field F is maximum between such heater wires, falling off gradually with distance from the pickup 56.

Now assume that the upright 25 moves from right to left, in FIG. 3A, at uniform speed past the pickup 56. It will be appreciated that the pickup 56 will produce a signal output that gradually rises to a maximum, and then decreases from such maximum. The photocell circuit 68 is designed to apply its reference square wave pulse (signal $a$) to the AND circuit 72 between the on-off period during the right-to-left movement of the upright 24; and since the threshold circuit 62 is set to block pickup 56 signals below the level L, a signal $b$ of duration $t_1-t_2$ is produced by the detector 60 which, when inverted (signal $c$) by the NOT circuit 64, prevents the AND circuit 72 from producing an output signal. Thus, the machine stop/alarm device 74 is not actuated when both heater wires 26, 28 are continuous.

Consider now, however, what happens when, say, only the heater wire 28 is continuous (FIG. 3B): First the overall field strength F at R is below the maximum which obtains when both heater wires are continuous. Secondly, though the reference on-off square wave duration provided by the photocell circuit 68 is the same (signal $a'$) as in FIG. 3A, the duration that the pickup signal is above the threshold level L (signal $b'$) is only for the duration $t'_1-t'_2$. Therefore, the detector 60 produces a narrower pulse than the photocell circuit 70; and when such narrower pulse is inverted by the NOT circuit 64 (signal $c'$), the AND circuit 72 has, for a time $\tau$, simultaneous inputs. Thus, the AND circuit 72 produces an output to actuate the machine stop/alarm device 74 when one (or both) of the heater wires 26, 28 is open.

Changes in the speed at which the conveyor elements 14 (uprights 24) traverse the test location R have no effect on the operability of apparatus according to the invention in its presently referred form. Though, say, an increased packaging machine speed will increase the steepness at which the pickup 56 signal goes from minimum to maximum and back to minimum again—whereby the duration of the detector signal $b$ will shorten—the duration of the reference pulse, signal $a$, will accordingly shorten also, thereby to keep the AND circuit 72 from producing an output so long as both heater wires are continuous.

The invention has been described in detail with particular reference to preferred embodiments thereof, but it will be understood that variations and modifications can be effected within the spirit and scope of the invention.

What I claim is:

1. Apparatus for checking the electrical continuity of a number of proximate electrical components connected electrically in parallel comprising:
   a. means for applying an alternating signal to said components,
   b. magnetic pickup means for scanning the fields surrounding the said components, and for producing signals in response to such fields, and
   c. means having a threshold response level for determining the envelope durations of said pickup signals,
   whereby long duration envelope signals indicate that said components are continuous, and vice versa.

2. The apparatus of claim 1 including:
   a. means for producing a signal having a reference duration, and
   b. means for determining the amount of difference that obtains between the said reference and pickup signal envelope durations.

3. The apparatus of claim 2 wherein said means for producing a signal having a reference duration is adapted to vary the said reference duration in proportion to the rate at which said pickup means scans the fields surrounding the said components.

4. The apparatus of claim 1 wherein the said electrical components are heater wires, and wherein the frequency of the said alternating signal is at least 6 kc. per second.

5. In a packaging machine of the type having
   a. a series of conveyor components, each of which components is provided with a plurality of adjacent electrical heater elements, and
   b. means for applying electrical energy to the pluralities of said heater elements of said components at a package heating location of said machine, the improvement comprising:
     1. means for applying a test alternating signal to the respective pluralities of heater elements of said conveyor component as said conveyor components move past a location of said machine,
     2. magnetic pickup means for sensing the alternating fields which obtain around said heater elements, and for producing signals in response thereto, and
     3. means for determining the relationship between the envelope durations of the said pickup signals, which are above a predetermined level, and a reference duration, thereby to determine whether any of the heater elements of the respective conveyor components are open.

6. The apparatus of claim 5 including:
   a. means responsive to the passage of said conveyor components past a location of said machine to produce a signal having said reference duration, and
   b. means for comparing the duration of the envelope of the said pickup signals with respect to the said reference duration to produce a signal, the duration of which is dependent on the operability of said heater elements.

7. The apparatus of claim 6 wherein the location of said machine at which said test signals are applied to said heater elements is remote from the location thereof at which electrical energy is applied to said heater elements.

8. The improvement of claim 5 wherein the frequency of said alternating signals is at least 6 kc. per second.